Patented July 10, 1945

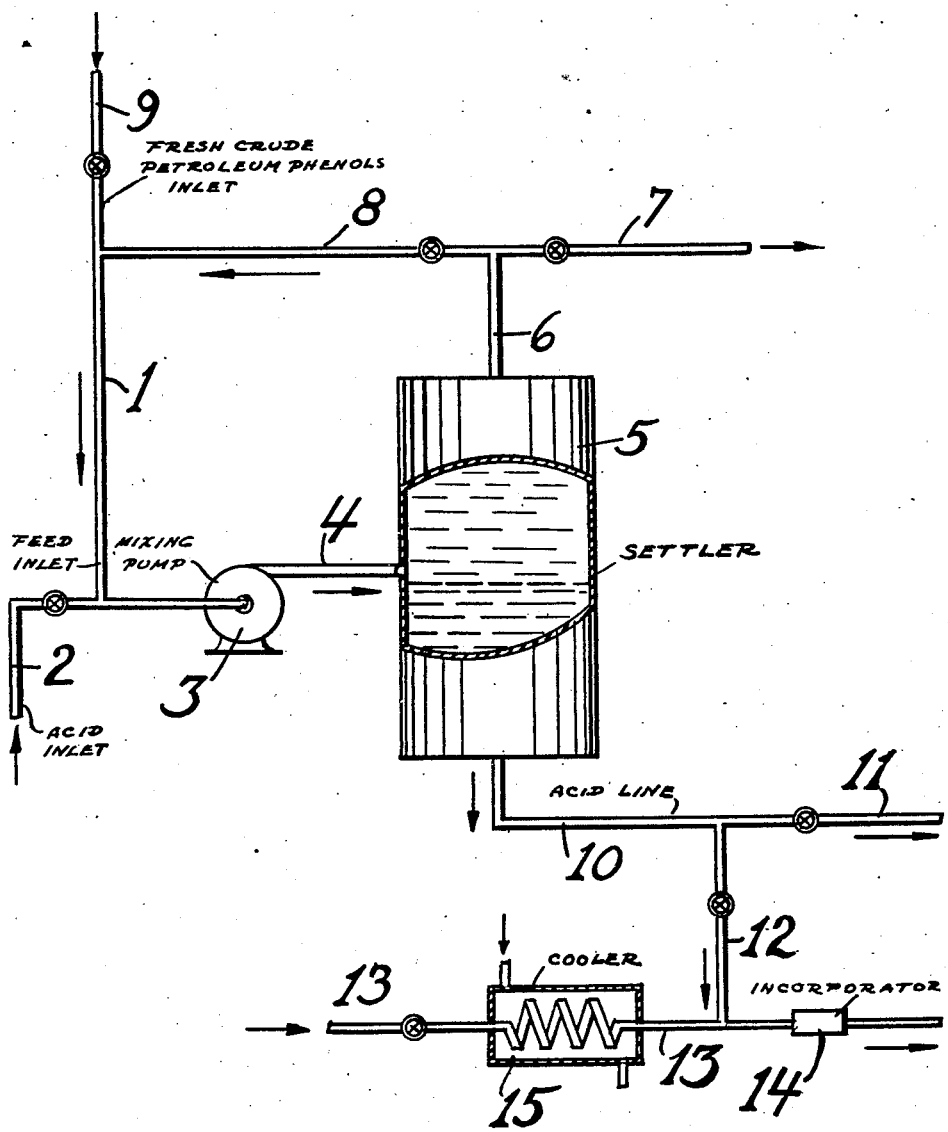

2,380,254

UNITED STATES PATENT OFFICE 2,380,254

METHOD OF INHIBITING HYDROCHLORIC ACID AGAINST CORROSIVENESS TO FERROUS METALS

Thomas B. McCulloch, Baytown, Tex., assignor to Standard Oil Development Company, a corporation of Delaware Application April 12, 1941, Serial No. 388,256

11 Claims. (Cl. 252—146)

This invention relates to a composition of matter and a method of producing same. More particularly, it is concerned with improved aqueous hydrochloric acid solutions whose corrosiveness to metals, especially steel, has been greatly abated by contacting the acid with crude phenolic materials of petroleum origin which for ease of discussion will hereinafter be referred to as crude petroleum phenolic materials.

The crude petroleum phenolic materials used in the present invention are obtained by extracting crude petroleum oils, and distillates thereof, with an alkali, suitably an aqueous solution of the hydroxide or carbonate of an alkali metal or ammonium. The crude petroleum phenolic soaps thus obtained may be used directly in the process of this invention, or the crude phenols may be first liberated by treatment with a suitable acid, such as $CO_2$ or a mineral acid. These materials are preferably used in the present invention in substantially the same crude state in which they are separated from the petroleum oil, with no further purification than the separation of excess alkali and other insoluble materials. Purification of these phenolic materials by distillation, or by repeated extraction with alkali followed by reacidification, for example, generally render them less effective for use in the present invention. A preferred type of crude petroleum phenols is the oily material secured upon partially or completely acidifying, with carbon dioxide or mineral acid, the soaps obtained by washing petroleum distillates, especially cracked distillates boiling in the range between about 250° F. and 750° F., with strong aqueous alkaline solutions, particularly 30° to 50° Baumé gravity strength alkali metal hydroxide solutions. Methods of obtaining these crude petroleum phenols are described in U. S. Patent 2,213,596.

It is known in the art that aqueous hydrochloric acid solutions can be inhibited against corrosiveness to metal surfaces in a manner that does not destroy or degrade the usefulness of the acid for such purposes as acidizing oil, gas or water wells and dissolving water-insoluble salt deposits from the surfaces of heat-exchange equipment. As a matter of fact, inhibiting the corrosiveness of the acid to metals enhances its value for these uses. It is known also that hydrochloric acid solutions are rendered substantially non-corrosive to metals by adding thereto small amounts of such substances as arsenic acid, arsenic trioxide, furfural, the furans, nitrogen bases (aniline, pyridine, quinoline, etc.), organic sulfur compounds (mercaptans, etc.), and acid sludges derived from sulfuric acid treatment of petroleum fractions.

It has now been found that aqueous hydrochloric acid solutions can be inhibited against corrosiveness to metals, particularly steel, by contacting the acid with crude petroleum phenols. The nature and quantity of inhibiting agent extracted from the crude petroleum phenols by the hydrochloric acid is not known, but the quantity is believed to be very small—usually less than 0.1% of the extracting acid and probably less than 1% of the crude petroleum phenols. Nevertheless, it has been found that, with good agitation and contact, 1 pound of crude petroleum phenols will properly inhibit approximately 20 pounds of 38% strength hydrochloric acid solution or 76 pounds of 15% strength hydrochloric acid solution.

In extracting the inhibitor agent from the crude petroleum phenols, it is preferable to employ concentrated, rather than dilute, aqueous hydrochloric acid solution since the former is a better solvent or extraction agent for the inhibitor and less quantity of acid has to be handled during the extraction operation. The concentrated acid can be diluted after inhibition to any desired weaker strength without destroying or degrading the effectiveness of the inhibitor contained therein. After the inhibitor has been extracted from the crude petroleum phenols, the latter may be purified and used for other purposes such as for inhibiting oxidation and gum formation in cracked gasolines. No difficulty is encountered in separating the crude petroleum phenols from the hydrochloric acid since they are only very slightly soluble in this reagent or in water.

The drawing is a diagrammatic sketch in partial sectional elevation of equipment suitable for carrying out the process of this invention. It illustrates one modification of the process for inhibiting hydrochloric acid against corrosiveness to metals, particularly steel, by contacting the acid with crude petroleum phenols. In this modification, crude petroleum phenols are introduced through line 1 into fresh strong hydrochloric acid solution, preferably of about 38 weight per cent strength concentration, being charged through line 2. This mixture is then passed through a mixing pump 3 (or equivalent means) where thorough mixing and good contact between the acid and phenols is effected before the mixture is discharged through line 4 to settler 5. In settler 5, the acid-phenols mixture separates into two phases. The crude petroleum phenols phase is withdrawn from settler 5 through line 6 and the hydrochloric acid phase is withdrawn through line 10.

In some cases, it may be desirable to discard from the system, through line 7, all of the crude petroleum phenols withdrawn from settler 5 by means of line 6. However, it is generally preferable to discard only a portion of these phenols, the balance being recycled through line 8 to line 1. Fresh make-up crude petroleum phenols are introduced into the system by means of line 9 which is in communication with line 1.

The inhibited strong hydrochloric acid solution in line 10 may be passed directly to storage through line 11; however, in some cases, it may be desirable to dilute all or a portion of the strong acid to a weaker strength before sending it to storage. In this latter case, the desired quantity of strong acid may be diverted through line 12 to line 13 in which the strong acid is mixed with the proper quantity of water to give the desired strength of weaker acid. This water-acid mixture is then passed through incorporator 14 for thorough mixing before being sent to storage. Since diluting the concentrated acid with water results in a considerable temperature rise (approximately 50° F. for equal volumes of acid and water), it is preferable to precool the dilution water by means of cooler 15 in line 13 ahead of the point of introduction of the acid. If desired, the acid may also be cooled either before or after dilution.

The conditions of temperature, strength of extraction acid, and volume ratio of extraction acid to fresh crude petroleum phenols may be varied over a considerable range and still secure satisfactory inhibition of the acid. For example, the extraction temperature may range between 40° and 100° F., but the preferred range is between 60° and 80° F. The strength of the hydrochloric acid solution employed to extract the inhibitor from the crude petroleum phenols may vary between about 20% and 43% HCl by weight; however, the preferred strength is in the range between 34% and 38% HCl. The volume ratio of extraction acid to fresh crude petroleum phenols may vary between about 8:1 to 25:1 for concentrated acids and between about 20:1 to 60:1 for dilute acids. The preferred ratios are in the neighborhood of 20:1 and 40:1, respectively, for concentrated and dilute acids. Conditions outside these various ranges may also be used, although in general they do not accomplish as effective an inhibition of the acid.

Although it is not essential that part of the extracted crude petroleum phenols, withdrawn from settler 5 through line 6, be recycled through line 8, this procedure is preferred, particularly when employing high ratios of extraction acid to fresh crude petroleum phenols. By recycling part of the crude petroleum phenols, instead of employing a once-through operation, better contact between the acid and the phenols is secured, thereby insuring more effective inhibition of the acid. Furthermore, such a procedure is conducive to a more stable operation and facilitates better separation of dispersed crude petroleum phenols from the acid phase in the settler. When employing the recycle operation, the volume ratio of acid to the total (fresh plus recycled) crude petroleum phenols charged to the mixing pump 3 may vary between the limits of about 50:1 to 0.5:1; however, the preferred range is between the limits of 10:1 to 2:1. In order to maintain equilibrium conditions in a recycle operation of this nature, it is necessary to withdraw from the system, through line 7, an amount of extracted crude petroleum phenols equivalent to the amount of fresh crude petroleum phenols charged to the system through line 9.

Although this invention has been described with reference to a specific embodiment of a process for contacting the hydrochloric acid with crude petroleum phenols, it is to be understood that any method and means of securing intimate contact between the acid and the crude petroleum phenols may be employed with satisfactory results. For example, the principles of countercurrent contact may be employed, using either a single tower or a multi-stage set-up.

A modification of the afore-described or preferred method of inhibiting hydrochloric acid against corrosiveness to metals, especially steel, consists of contacting the acid to be inhibited directly with crude petroleum phenolic soaps which have been secured by washing petroleum distillates, particularly cracked distillates, boiling in the range between about 250° F. and 750° F. with strong aqueous alkaline solutions, especially 30° to 50° Baumé gravity strength caustic solutions. In this modified process, the contacting of the acid to be inhibited with the crude petroleum phenolic soaps accomplishes two things: first, the acid reacts with the soaps to liberate crude petroleum phenols and, second, the acid extracts from the liberated crude petroleum phenols the inhibiting agent desired. Hence, the process may be considered as differing from the one previously described only in respect to the omission of a preliminary step in which the crude petroleum phenols are liberated and freed of undesirable salts before coming in contact with the hydrochloric acid to be inhibited. Although this modified process will accomplish the desired result, it is less attractive for commercial operation than is the preferred process (previously described) for three reasons: (1) the large quantity of heat liberated upon reaction of the concentrated hydrochloric acid with the soaps would necessitate the use of elaborate and expensive cooling facilities for controlling the temperature of the reaction mixture; (2) a loss in acid strength would result from the utilization of HCl to neutralize and acidify the soaps; (3) the expensiveness of hydrochloric acid in comparison with that of sulfuric acid or carbon dioxide makes its use as a reagent for neutralizing and acidifying the crude petroleum phenolic soaps undesirable.

Where the hydrochloric acid is inhibited by contacting it directly with crude petroleum phenolic soaps, the operation is essentially the same as that already described for the contacting of hydrochloric acid with crude petroleum phenols, except for a means of cooling the contact mixture which must be provided in order to control the reaction temperature and for slightly different ratios of hydrochloric acid to fresh crude petroleum phenolic soaps. The quantity of crude petroleum phenolic soaps required to properly inhibit the acid varies considerably with the quality and type of soaps employed. However, it is usually possible to satisfactorily inhibit about 8 to 12 volumes of concentrated hydrochloric acid or 12 to 18 volumes of dilute hydrochloric acid by intimately contacting the acid with one volume of a well-settled crude petroleum phenolic soap, especially where the soap is derived from the treatment of cracked petroleum distillates boiling in the range between about 250° and 750° F. with a 40° to 50° Baumé gravity strength caustic solution. The undissolved crude petroleum phenols, which are liberated from the soaps upon contacting the latter with the hydrochloric acid, may be settled and separated from the acid in the manner previously described. Likewise, a portion of the undissolved crude petroleum phenols may be recycled and mixed with the incoming charge of fresh crude petroleum phenolic soaps. The ratio of recycled crude petroleum phenols to fresh crude petroleum phenolic soaps preferably varies between about 1:1 to 10:1.

When starting with crude petroleum phenolic soaps as a source of inhibitor for hydrochloric acid, the preferable procedure is to first settle out and separate as much of the caustic (or alkaline reagent) as possible; then dilute the soap solution with about an equal volume of water. This dilution usually causes separation of some neutral oils which are preferably removed from contact with the dilute soap solution before the latter is acidified with a sufficient amount of dilute sulfuric acid (of approximately 30% strength) or carbon dioxide to partially or completely liberate (as desired) the crude petroleum phenols contained therein. Salt may be added to the aqueous solution to increase its density and thereby facilitate a more rapid separation of the oily, liberated crude petroleum phenols from the aqueous phase. After separating them from contact with the aqueous solution liberated therefrom, the crude petroleum phenols may be contacted directly with the hydrochloric acid to be inhibited in accordance with the preferred method.

The following examples are presented for purpose of illustrating the feasibility of inhibiting hydrochloric acid against corrosiveness to steel by contacting the acid with crude petroleum phenols. These examples are not to be construed as limiting the scope of the invention in any manner whatsoever.

Example 1

100 grams of a 38% strength hydrochloric acid solution in water were mixed with 10 grams of crude petroleum phenols derived from a mixture of cracked and straight-run distillates boiling in the range between 250° F. and 750° F., and the mixture was stirred for 5 minutes. After settling and separating the crude petroleum phenols phase from the acid phase, the latter was tested for its corrosiveness to steel by immersing in it for 24 hours a weighed strip of steel of known surface area. This steel strip was then removed, carefully washed and dried, and then reweighed to determine the loss of metal due to corrosion. By a process of simple calculation, the corrosion units were converted from "weight of metal lost per unit surface area per day" to "inches of penetration into the metal per year," since the latter units are more comprehensible and more convenient for use than are the former. The results obtained in this experiment are tabulated in Table I below. As a basis for comparison, the corrosiveness of uninhibited 38% strength hydrochloric acid solution to steel, tested under the same conditions, is also listed.

For purpose of comparison, a second 100-gram batch of 38% strength hydrochloric acid was contacted for 5 minutes with 10 grams of crude petroleum phenols derived from only cracked distillates boiling in the range between 250° F. and 750° F. After settling and separating the phenol phase from the acid phase, the latter was tested for its corrosiveness to steel by the method described in the preceding paragraph. The results are also tabulated in Table I below:

Table I

| Corrosive agent | Penetration of corrosion into steel, inches per year |
|---|---|
| 38% strength HCl solution uninhibited | 7.25 |
| 38% strength HCl solution inhibited by contacting with crude petroleum phenols derived from mixture of cracked and straight-run distillates | 0.0960 |
| 38% strength HCl solution inhibited by contacting with crude petroleum phenols derived from only cracked distillates | 0.1186 |

Example 2

The fact that the acid inhibiting power displayed by the crude petroleum phenols is not an inherent property of phenolic type compounds is demonstrated in this experiment.

A 10-gram sample of commercial Tricresol and a 4-gram sample of commercial phenol (carbolic acid) were contacted for 5 minutes with separate 100-gram batches of 38% strength hydrochloric acid solution. The commercial phenol was completely dissolved by the acid but the Tricresol was not; hence, the latter material had to be separated from its corresponding batch of acid before both samples of inhibited acid could be tested for their corrosiveness to steel in accordance with the method described under Example 1. Both of these inhibited acids were very corrosive to steel, as will be noted from the data in Table II. Hence, Tricresol and carbolic acid must be considered as very poor inhibitors against corrosiveness of hydrochloric acid to steel:

Table II

| Corrosive agent | Penetration of corrosion into steel, inches per year |
|---|---|
| 38% strength HCl solution uninhibited | 7.25 |
| 38% strength HCl solution inhibited with tricresol | 4.46 |
| 38% strength HCl solution inhibited with carbolic acid | 6.60 |

Example 3

This experiment illustrates the effect which temperature has upon the rate that steel is corroded by hydrochloric acid, both weak and strong solutions, which have and which have not been inhibited in accordance with this invention.

100 parts by weight of 38% strength aqueous hydrochloric acid were contacted with 10 parts by weight of crude petroleum phenols for 5 minutes at 75° F. The mixture was then allowed to settle; after which, the acid phase was separated from the phenol phase. Samples of this inhibited acid and also samples of uninhibited 38% strength aqueous hydrochloric acid were tested for their corrosiveness to steel at temperatures of 75°, 100°, 120° and 140° F. in accordance with the method described under Example 1. Similarly, samples of both the inhibited and the uninhibited 38% strength aqueous hydrochloric acid solutions were diluted to 15% strength solution and each was then tested in a like manner for its corrosiveness to steel at temperatures of 75°, 135°, 155° and 170° F. The results are listed in Table III below:

Table III

| Strength of hydrochloric acid solution, percent by weight HCl | Temperature of contact between acid and steel, °F. | Penetration of corrosion into steel, inches per year | |
|---|---|---|---|
| | | Uninhibited acid | Inhibited acid |
| 38 | 75 | 7.25 | 0.0969 |
| 38 | 100 | 25.89 | 0.8351 |
| 38 | 120 | 49.46 | 13.79 |
| 38 | 140 | 124.7 | 101.3 |
| 15 | 75 | 0.4860 | 0.088 |
| 15 | 135 | 4.83 | 0.1812 |
| 15 | 155 | 12.16 | 1.09 |
| 15 | 170 | 21.12 | 14.62 |

It will be noted that the inhibited 38% strength acid corrodes steel rapidly at temperatures above about 100° F., but that the inhibited 15% strength acid may be employed at temperatures above 155° F. without experiencing excessive corrosion on steel. In acidizing oil wells, it is customary to employ 15% strength hydrochloric acid at elevated temperatures; hence, the properties of the 15% strength acid are favorable for this usage.

EXAMPLE 4

A 107-gram batch of crude petroleum phenols was shaken vigorously for 5 minutes with three separate and successive 1070-gram batches of fresh 38% strength hydrochloric acid solution. In each case, the undissolved portion of the phenols was separated from the acid and the inhibited acid was divided into two parts. One portion of each batch of acid thus inhibited was tested per se for its corrosiveness to steel strips in accordance with the method described under Example 1. The second portion of each separate batch of inhibited acid was first diluted to a 15% strength solution and then tested for its corrosiveness to steel by this same method. The results obtained in this experiment are tabulated below:

Table IV

| Strength of HCl | Penetration of corrosion into steel, inches per year | | | |
|---|---|---|---|---|
| | Uninhibited acid | Inhibited acid | | |
| | | 1st batch | 2nd batch | 3rd batch |
| 38% (undiluted) | 7.25 | 0.0587 | 0.03359 | 8.35 |
| 15% (diluted) | 0.4860 | 0.0080 | 0.0080 | 0.0083 |

It will be noted from these data that the third batch of acid contacted with the petroleum phenols showed little or no corrosion inhibition properties when employed in the undiluted state but, when diluted to a 15% strength solution, satisfactory inhibition was manifested. The nature of this phenomenon is not understood, but it is an important feature since most of the uses for inhibited acid employ the weak, rather than the strong, solution. The data also indicate that, had counter-current contact between the acid and the crude petroleum phenols been employed, one pound of the crude petroleum phenols would have satisfactorily inhibited approximately 20 pounds (2 gallons) of 38% strength hydrochloric acid or approximately 76 pounds (8 gallons) of 15% strength hydrochloric acid.

Hydrochloric acid solutions inhibited with crude petroleum phenols in the manner described in this application, especially the dilute solutions, are particularly well adapted for use in acidizing oil, gas and water wells to increase their rate of production. Another important use for the inhibited acid is in the dissolution and removal of water-insoluble salt deposits from heat exchange equipment. Steam boilers, heat exchangers, etc., handling hard waters gradually lose their heat transfer efficiencies while in operation due to deposition of water-insoluble salts on their heat transfer surfaces. These water-insoluble salt deposits are most conveniently removed by circulating hydrochloric acid through the equipment. In order to avoid excessive damage to the equipment, it is desirable to employ an acid that has been inhibited against corrosiveness to steel. Hydrochloric acid inhibited by contacting same with crude petroleum phenols is particularly well adapted for this purpose.

It is permissible and desirable in some cases to incorporate with the inhibited hydrochloric acid (of this invention) an acid intensifying agent such as the fluorides of sodium, potassium, ammonium, hydrogen, lithium, aluminum, and tin. Similarly, surface activating agents may be incorporated with the inhibited acid. Some particularly good surface activating agents are: the amino alcohols, the sulfonated alcohols, the alkylated aryl sulfonates and other compounds of similar composition and characteristics.

The nature and objects of the present invention having thus been described, what is claimed as new and novel and what is desired to be protected by Letters Patent is:

1. A composition of matter comprising aqueous hydrochloric acid and an inhibitor of ferrous metal corrosion, said inhibitor being derived from crude phenols of petroleum origin by extraction of such phenols with hydrochloric acid.

2. A composition of matter comprising aqueous hydrochloric acid and not more than 0.1 per cent of an inhibitor of ferrous metal corrosion, said inhibitor being derived from crude phenols of petroleum origin by extraction of such phenols with hydrochloric acid.

3. The method of inhibiting hydrochloric acid against corrosiveness to ferrous metals which comprises contacting said acid with crude phenols of petroleum origin, settling the mixture, and separating the inhibited acid from the undissolved material.

4. The method of inhibiting strong aqueous hydrochloric acid against corrosiveness to ferrous metals which comprises contacting a 20 to 43 per cent strength hydrochloric acid with crude phenols of petroleum origin in the ratio of 100 volumes of acid to between 4 and 10 volumes of crude phenols, settling the mixture, and separating the inhibited acid from the undissolved crude phenols.

5. The method of inhibiting strong aqueous hydrochloric acid against corrosiveness to ferrous metals which comprises contacting a 34 to 38 per cent strength hydrochloric acid with crude phenols of petroleum origin in the ratio of 100 volumes of acid to between 6 and 8 volumes of crude phenols, settling the mixture, and separating the acid from the undissolved crude phenols.

6. The method of producing a dilute hydrochloric acid solution which is substantially non-corrosive to ferrous metals comprising contacting a 20 to 43 per cent strength hydrochloric acid with crude phenols of petroleum origin in the ratio of 100 volumes of acid to between 4 and 10 volumes of crude phenols, settling the mixture, separating the inhibited acid from the undissolved crude phenols, and diluting the acid with water.

7. The method of producing a dilute hydrochloric acid solution which is substantially noncorrosive to ferrous metals comprising contacting a 34 to 38 per cent strength hydrochloric acid with crude phenols of petroleum origin in the ratio of 100 volumes of acid to between 6 and 8 volumes of crude phenols, settling the mixture, separating the inhibited acid from the undissolved crude phenols, and diluting the acid with water.

8. The method of inhibiting strong aqueous hydrochloric acid against corrosiveness to ferrous metals which comprises contacting a 20 to 43 per cent strength hydrochloric acid with a mixture of fresh and recycled crude phenols of petroleum origin in the proportion of 100 volumes of acid with 4 to 10 volumes of fresh crude phenols of petroleum origin and 4 to 40 volumes of recycled crude phenols, settling the acid-phenols mixture, separating from the acid the undissolved crude phenols, recycling a portion of the undissolved crude phenols and mixing same with the fresh crude phenols being charged to the system.

9. The method of inhibiting strong aqueous hydrochloric acid against corrosiveness to ferrous metals which comprises contacting a 20 to 43 per cent strength hydrochloric acid with crude phenolates of petroleum origin in the ratio of 100 volumes of acid to between 8 and 13 volumes of crude phenolates, settling the mixture, and separating the inhibited acid from the undissolved crude phenols liberated from the phenolates.

10. The method of producing a dilute hydrochloric acid solution which is substantially noncorrosive to ferrous metals comprising contacting a 20 to 43 per cent strength hydrochloric acid with crude phenolates of petroleum origin in the ratio of 100 volumes of acid to between 5 and 9 volumes of crude phenolates, settling the mixture, separating the acid from the undissolved crude phenols liberated from the phenolates, and diluting the acid with water.

11. The method of inhibiting strong aqueous hydrochloric acid against corrosiveness to ferrous metals which comprises contacting a 20 to 43 per cent strength hydrochloric acid with a mixture of fresh crude phenolates of petroleum origin and recycled crude phenols of petroleum origin in the proportion of 100 volumes of acid with 8 to 13 volumes of fresh crude phenolates and 4 to 10 volumes of recycled crude phenols, settling the acid-phenols mixture, separating from the acid the undissolved crude phenols, recycling a portion of the undissolved crude phenols and mixing same with the fresh crude phenolates being charged to the system.

THOMAS B. McCULLOCH.